Figure 1:
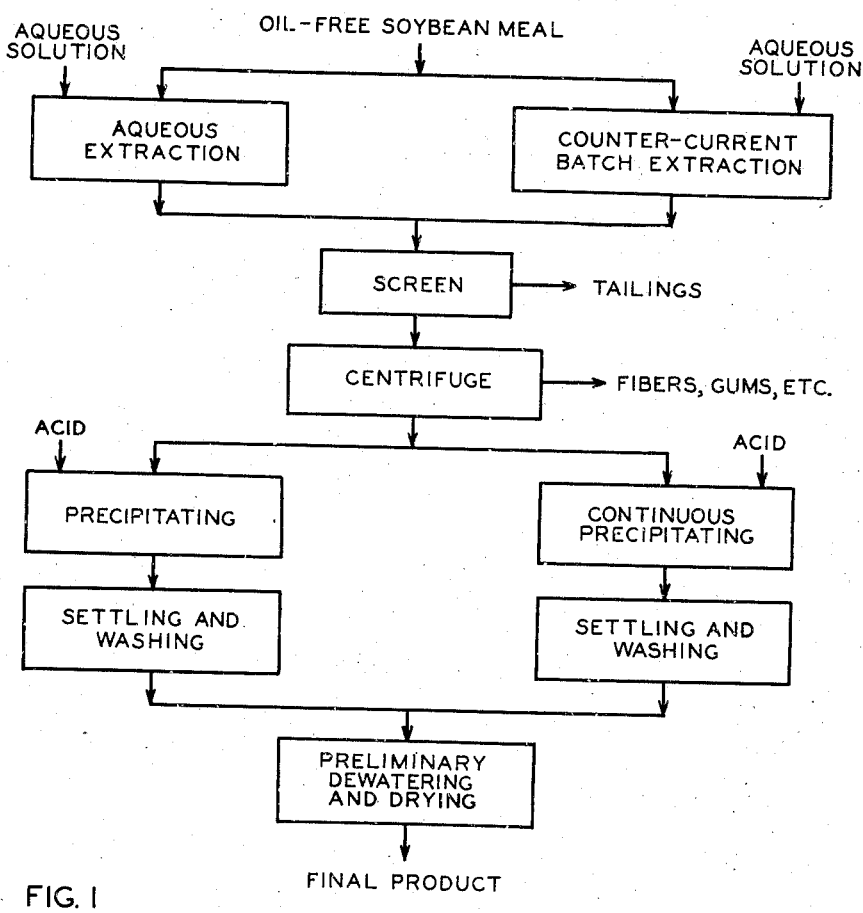

JAMES J. EBERL
RICHARD T. TRELFA
INVENTOR.

BY Ernest G. Peterson

AGENT

Patented Aug. 16, 1949

2,479,481

UNITED STATES PATENT OFFICE 2,479,481

PROCESS FOR ISOLATING UNDENATURED SOYBEAN PROTEIN

James J. Eberl, Bound Brook, N. J., and Richard T. Trelfa, Kalamazoo, Mich., assignors to Hercules Powder Company, Wilmington, Del., a corporation of Delaware Application January 28, 1947, Serial No. 724,838

1 Claim. (Cl. 260—112)

This invention relates to a method of isolating a substantially undenatured protein from vegetable material and more specifically to the extraction of oil-free soybean meal under controlled conditions to obtain a product having substantially the properties of the protein in its naturally-occurring state.

The common methods of preparing soybean protein comprise extracting oil-free soybean meal with a protein solvent and subsequently or simultaneously hydrolyzing the protein extract with an alkali at elevated temperatures. Hydrolysis of the protein at some point prior to its utilization has been necessary to render it soluble and nongelling at relatively high concentration in the weakly alkaline dispersions used in adhesives and coating materials; however, this hydrolysis is undesirable in that it requires the use of additional amounts of chemicals and particularly in that it gives products of poor color and low strength. It has been recognized by Brier and Mulder (U. S. Patent 2,297,685) and others that the insolubility of isolated proteins in weakly alkaline media and the consequent necessity for hydrolysis results from the fact that the proteins have become denatured during their isolation. However, prior to the present invention no one has been able to isolate a substantially undenatured product. Thus, Brier and Mulder, referred to above, obtain a partially undenatured protein, but even this material, as indicated by the inventors (U. S. 2,271,620) must be hydrolyzed to a degree to effect its dispersion. Thus, the problem facing the art has been that of preparing from soybeans an undenatured protein which would give concentrated dispersions of low viscosity without the darker color and reduced strength of the hydrolyzed product and which would have properties suitable for widely varied uses such as, for example, fiber formation, paper coating, and the like.

Now in accordance with the present invention, it has been found that a substantially undenatured protein may be isolated from soybeans by extracting soybean meal which has been freed from oil at a low temperature with an aqueous solvent, at a pH between about 6.0 and 9.0, clarifying the resulting extract and precipitating the protein therefrom with acid under carefully controlled conditions as set forth hereinafter. According to one form of the invention, the extraction of the soybean meal with a substantially neutral aqueous solvent is carried out as a batch countercurrent process, fresh solvent being used for a final extraction on a partially exhausted soybean meal and a solvent already containing considerable quantities of protein being used for the extraction of fresh soybean meal. According to a further specific form of the invention, the precipitation of the protein with acid is carried out in a continuous process by injecting a controlled quantity of acid into a locally turbulent stream of protein-containing liquid whereby there results a substantially instantaneous precipitation. Throughout the entire process of the invention, according to any of the forms thereof, operating conditions are carefully controlled to prevent denaturation of the protein. Accordingly, the temperatures employed are low, strongly alkaline or strongly acid solutions are avoided, the total time involved in each of the various steps and in the isolation as a whole is held to a minimum, fermentation is prevented by the addition of a bactericide, softened water is used throughout to reduce to a minimum the presence of metallic impurities, and the drying of the final product is carried out at a low temperature.

Figure 2:
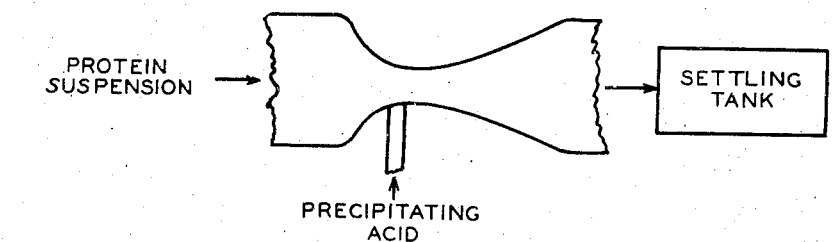

Having now indicated in a general way the nature and purpose of the invention, there follows a more detailed description of preferred embodiments thereof with reference to the accompanying drawing in which:

Fig. 1 is a flow sheet of the process according to this invention, and Fig. 2 is a diagrammatic flow sheet of a mixing T for protein precipitation.

As illustrated in Fig. 1, finely-divided oil-free soybean meal is mixed with an aqueous solvent at a controlled pH in a mixing tank after which it is passed over a fine mesh screen with screen openings of such a size that the fibrous residue is retained on the screen while the extract liquors pass freely therethrough. The extract liquors are then passed to a centrifuge whereby the solution is purified and suspended impurities are removed. The protein in the solution from the centrifuge is then precipitated by introducing thereto an acid to lower the pH of the solution substantially to the isoelectric point of the protein. The supernatant liquor containing water-soluble impurities is decanted off, the precipitate optionally is washed, and the purified precipitate is then dried under controlled temperature conditions.

In a further form of the invention, the protein is extracted from the oil-free soybean meal in a cycle of countercurrent extractions in place of the single extraction. The subsequent operations, however, are unchanged.

According to a still further form of the invention, the protein-containing liquor from the centrifuge is passed through a mixing T while a precipitating acid is continuously introduced thereto. The liquor passes from the mixing T to a settling tank wherein the precipitated protein is allowed to settle, optionally is washed, and is dried as previously described. In Fig. 2, there is shown diagrammatically the mixing T used for this latter process of protein precipitation. In the conducting line of the T, there is a constriction through which the protein-containing liquor passes on its way to settling tank and in which a high degree of local, mixing turbulence is effected, the liquor almost immediately passing beyond the restriction to a relatively non-turbulent space where curd formation occurs in the absence of curd-breaking turbulence. The precipitating acid is introduced through a side arm in the T into the turbulent stream.

The following represent examples of the invention for the purpose of illustration and should not be construed as limiting the scope of the invention:

*Example I*

A charge was prepared comprising 225 parts of soybean meal containing 89.8% solids and 52.4% protein (by nitrogen analysis), 3375 parts of softened water, and 0.45 part of phenyl mercuric acetate dissolved in diethylene glycol monoethyl ether solvent in the ratio of 45 grams per liter. This charge was stirred for 30 minutes, during which time it was held at 25° C. and then was passed over a 200-mesh stainless steel shaking screen which separated the crude fibrous material or tailings from the extraction liquors, using a water spray against the upper surface of the screen to facilitate complete separation. The liquors from the screening operation were then passed through a high speed centrifuge having a bowl speed of 15,000 R. P. M., wherein the suspended impurities were separated out. The pH of the liquors was tested at least once every hour and controlled between pH 6.6 and 6.5 by the addition of dilute sulfuric acid or sodium hydroxide if necessary. The temperature throughout the entire operation was controlled below a maximum of 45° C. and preferably between 25 and 30° C. The entire operation, including leaching, screening, and centrifuging, required 5¼ hours.

The proteinaceous extract was placed in a corrosion-resistant tank and treated with sulfur dioxide gas with intermittent mild agitation to bring the pH to 4.6. The sulfur dioxide gas was introduced as rapidly as possible without undue bubbling in order to bring the pH to the desired level in the minimum possible time. As the solution became acid, the protein was precipitated in a heavy curd. The precipitated protein was then allowed to settle for 4 hours, at the end of which time 2110 parts of supernatant liquid was decanted. The liquid was brought up to its original level by adding 2110 parts of water which had been heated to 30° C. and acidified to a pH of 4.6, and the protein slurry was then agitated mildly. The slurry was allowed to settle for 4½ hours and 1960 parts of supernatant liquor was decanted. The total time elapsed from the beginning of the precipitation step was 11¾ hours.

The settled protein slurry was passed through the super-centrifuge to obtain a wet protein cake whose total weight was 122 pounds containing 65.7 pounds of solids, of which 63.1 pounds was protein (by nitrogen analysis). The protein cake was broken up by means of a curd breaker into small particles approximately ⅜ inches in diameter and no larger than ½ inch in diameter, and the particles were placed in ½-inch layers on corrosion-resistant 60-mesh screen trays. The protein particles were dried at a relatively low temperature by passing thereover dry air heated to 70° C.; the surface temperature of the protein particles was considerably lower, due to evaporation, and was at no time permitted to rise above 42° C. During the final stages of the drying, the air temperature was dropped to 50° C. and finally to 45° C. to prevent overheating the protein. The final dried product was dispersible in alkali to give a 25% dispersion or alternatively was satisfactorily dispersed at pH 7.0. A portion of the protein was denatured by being dispersed in aqueous sodium hydroxide at 45° C. to 50° C., the final concentration of protein being 6% and the pH 9.1. This dispersion had a Stormer viscosity of 322 cp. at 25° C.

*Example II*

There were prepared two separate charges, each one comprising 40 parts of soybean meal containing 90.4% solids and 52.9% protein (by nitrogen analysis), 600 parts of softened water, and 0.075 part of phenyl mercuric acetate dissolved in diethylene glycol monoethyl ether solvent in a ratio of 45 pounds per liter. The first charge was held at 25° C. while being stirred for 30 minutes and was passed over a stainless steel screen which separated the crude fibrous tailings from the extraction liquor. The extraction liquor was discarded and an additional 600 parts of water was added to the tailings and the extraction and screening process repeated. The second extraction liquors likewise were discarded. A third extraction was then carried out by adding another 600 parts of water to the tailings and extracting and screening as previously. The extraction liquors from this third extraction were saved and the tailings discarded.

The second charge was extracted one time and screen separated and the first extraction liquors discarded. To the tailings from this extraction and screening were added the extraction liquors from the third extraction of the first charge. The resulting slurry was then agitated for 30 minutes at 25° C. and screened as above, and both the extraction liquors and the tailings were saved. The extraction liquors were labeled "intermediate extraction liquors" and set aside for further use.

To the tailings from this last extraction was added an additional 600 parts of water and an extraction and screening operation carried out. The extraction liquors from this operation were labeled "low concentration extraction liquors." The tailings were discarded.

A third batch comprising 40 parts of soybean meal was prepared and this third batch was extracted with the intermediate extraction liquors previously prepared and set aside. The slurry was screened and the liquor obtained thereby was saved and labeled "concentrated extraction liquors." The tailings from this extraction were then extracted with the low concentration extraction liquors previously prepared and set aside and the mixture screen separated, the extraction liquors thereby becoming "intermediate extraction liquors."

These tailings were once again extracted by a fresh charge of 600 parts of softened water, the extraction liquors thus becoming "low concentration extraction liquors."

By repeating the extraction and separations, as outlined above, there were obtained three types of extraction liquors, considered respectively, as the concentrated, intermediate, and low concentration extraction liquors. The low concentration extraction liquors were obtained by a fresh water extraction of a batch of soybean meal which had been previously twice extracted. The intermediate liquors were obtained by using the low concentration liquors for the extraction of a batch of soybean meal which had been previously extracted one time. The concentrated liquors were obtained by extracting a batch of fresh soybean meal with the intermediate concentration liquors.

The three-stage process was continually repeated with high concentration liquors being passed to a centrifuge feed tank for further processing while the low intermediate concentration liquors were passed to other leach tanks for additional extraction of fresh incoming meal or partially extracted tailings. Similarly, three-times extracted tailings were discarded while once- and twice-extracted tailings were conveyed to other leach tanks for further treatment with incoming extraction liquors. After the extractions were repeated for five steps to insure equilibrium conditions, analyses of the fractions were taken. Concentrated extraction liquor was recovered from the tailings to the extent of 520 parts which analyzed 3.69% protein (by nitrogen analysis) or a total of 19.2 parts of protein extracted. This corresponds to 90.5% of the total protein present in the meal or 53% of the dry meal weight.

The concentrated liquor was further processed according to the procedure of Example I; namely, centrifuging, precipitating with sulfur dioxide gas at pH 4.5 to 4.7, settling, washing, recovering by centrifuging, and drying.

Example III

A soybean meal charge was prepared, extracted with water, screened, and the separated liquor centrifuged, as in Example I. The liquor from the centrifuge was passed into a settling tank through a mixing T having a constriction and having a side arm leading into the T at the constriction. An acidified water was prepared by saturating softened water with sulfur dioxide gas, and the acidified water was fed into the mixing T through the side arm at a controlled rate of flow such that the liquor emerging from the mixing T was between pH 4.5 and 4.7. As the liquor passed through the constriction in the mixing T, a high degree of turbulence was obtained whereby the acidified water was instantaneously mixed with the centrifuge liquor and the protein was precipitated in a rapidly settling curd which was allowed to settle for 3 hours in the settling tank. At the end of this time the supernatant liquid was decanted and the curd washed, recovered by centrifuging, and dried according to Example I.

Example IV

A charge was prepared comprising 225 parts of soybean meal containing 89.8% solids and 52.4% protein (by nitrogen analysis), 3375 parts of softened water, and 0.45 part of phenyl mercuric acetate dissolved in diethylene glycol monoethyl ether solvent in a ratio of 45 grams per liter. To this charge was added dilute sodium hydroxide to bring the charge to a pH of 8.0. The charge was stirred for 30 minutes at 25° C. and was then passed over a 200-mesh stainless steel screen to separate the fibrous tailings from the extraction liquors. The liquors were then purified and the protein recovered therefrom as in Example I by centrifuging, precipitating with sulfur dioxide gas, washing, and drying.

The soybean meal from which the protein is extracted, according to this invention, is obtained by grinding or otherwise comminuting raw soybeans at low temperatures to a meal and then extracting the meal by means of a low boiling solvent such as, for example, hexane. The removal of the oil is carried out at a low temperature to avoid denaturation of the protein. The meal prepared by removal of oil with other solvents may likewise be used provided care is taken to maintain a low temperature throughout the extraction and drying; however, it is preferable to use a low-boiling solvent inasmuch as there is thereby minimized the danger of processing at too high a temperature.

The soybean meal which is used as a raw material of this process is then thoroughly mixed with the extraction water in a ratio between about 7 parts of water to 1 part of meal and about 100 parts of water to 1 part of meal. In the preferred range a slurry is made comprising 1 part of meal for from 10 to 20 parts of water, preferably 1 part of meal to about 15 parts of water. At this range the extraction of the protein is substantially complete; there is only a slight increase in efficiency with the use of additional water whereas the use of additional water results in excessive and unnecessary waste and, in general, a ratio of water to meal below about 7 to 1 is avoided inasmuch as there is a noticeable decrease in efficiency and, in addition, the slurry becomes thick and somewhat unworkable.

The water used for this extraction step is either naturally soft water or water which has been purified to remove ionic impurities. The water must contain no more than about 4 parts per million iron and no more than about 70 parts per million chromium or magnesium. Optionally, there may be used a dilute salt solution containing up to approximately ½% sodium chloride, potassium chloride, or the like.

The water and, likewise, the slurry during the extraction period is maintained at a pH between 6.0 and 9.0 and preferably between about 6.4 and 7.0. The desired pH may be obtained by adding acid or alkali such as, for example, hydrochloric acid, sulfuric acid, water acidified with sulfur dioxide gas, sodium hydroxide, or the like, the acidifying or alkalizing agent being added before the extraction and, if necessary, to the slurry during the extraction process.

The temperature during the extraction step is maintained below 45° C. and preferably in a range between about 20° C. and about 35° C., usually at about 25° C. During the extraction process the soybean meal slurry containing considerable quantities of carbohydrates tends to ferment with a resulting decrease in pH; this tendency is overcome by using a bactericide to prevent the fermentation process. For example, phenyl mercuric acetate is added to the slurry in a water-miscible organic solvent. It will be understood, however, that there may be substituted therefor other bactericides with the limitation that many common bactericides also form highly colored or insoluble complexes with protein materials, particularly in the presence of impurities such as iron, copper, aluminum, or the like, and such bactericides must be avoided, or must be used with care to avoid contamination.

After the extraction, the slurry is passed through a fine mesh screen, for example, a 200-mesh stainless steel screen, optionally with a spray of water being used on the upper surface of the screen in the case of a shaking or vibrating screen, whereby substantially complete separation of the soluble and suspended materials from the fibrous portion is obtained. After screening, liquor preferably is passed through a high speed centrifuge to separate out suspended fibers and similar impurities which passed through a screening operation.

In the screening and centrifuging operations the pH and temperature are checked constantly and any variations from the optimum conditions immediately countered by addition of acid or alkali. The temperature must be controlled below 45° C. and preferably around 25° C. to 30° C. and the pH retained substantially in the same range as for the extraction process.

The precipitation of the protein from the purified extraction liquors is effected by reducing the pH to substantially the isoelectric point of the protein by the addition of an acid; there may be used any suitable acid such as, for example, hydrochloric acid, sulfuric acid, sulfurous acid, or sulfur dioxide gas, acetic acid, or the like. According to the preferred form of the invention, the precipitating acid used is sulfur dioxide gas either bubbled directly into the solution or, alternatively, passed into water which is acidified thereby and which subsequently is added to the protein-containing solution. The precipitation should be carried out between the range of about pH 3.5 to 5.0 and preferably at a pH between 4.3 and 4.9. In order to obtain most satisfactory results, the pH should be reduced relatively rapidly and with rapid mixing by adding the acidifying agent at a rapid pace. In this way the precipitation of the protein can be accomplished largely at the optimum pH rather than being accomplished slowly as the pH is being lowered to the optimum value. In the preferred procedure, the pH is lowered as rapidly as possible at a range between 4.5 and 4.7 and retained at this range for about half an hour while precipitation and settling take place.

For the precipitation of the protein the temperature must be held below 45° C. in order to prevent denaturation of the protein, preferably between about 30° C. and 35° C. at which temperature the protein is precipitated in a heavy and easily processed curd and with a minimum of denaturation.

As previously stated, it is desirable to have the acidification of the protein-containing liquid brought about as nearly instantaneously as possible. Where this is done by means of adding an acidifying agent to a large quantity of protein-containing liquid, the acidification should be carried out as rapidly as practicable; however, in the preferred form of the invention, the acidification is carried out almost instantaneously by injecting the acidifying agent directly into a turbulent stream of the protein-containing liquid. This may be accomplished, for example, by means of apparatus diagrammatically illustrated in Fig. 2 wherein the protein-containing liquid passes through a conducting line having a constriction therein. As the liquid passes through the constriction, a high rate of flow is obtained and, likewise, a high degree of turbulence. Since the acidifying agent is added continuously to a small volume of the protein-containing liquid and since there is a high degree of turbulence throughout this entire small volume, the protein will be precipitated almost instantaneously at the optimum conditions of temperature and pH.

After the precipitation step the protein is allowed to settle, the supernatant liquid decanted, and optionally the precipitated protein washed to remove various water-soluble impurities. The decantation and washing likewise must be carried out below 45° C. preferably in the same range of temperature and pH as used for the precipitation step; namely, between 30° C. and 35° C. and pH between 3.5 and 5.0, preferably between 4.3 and 4.9. The removal of the water from the isolated protein may be carried out by filtration, centrifuging, spray drying, or the like, or by means of treatment with a volatile organic solvent. It generally is advisable to use a preliminary centrifuging or preferably to filter the settled protein, for example, with a rotary-type vacuum filter to remove a large proportion of the water; the centrifuging or filtering step produces a wet protein cake which has been satisfactorily further dehydrated by other methods. For example, the protein cake may be broken up into relatively small particles and dried in a stream of dry, warm air. When the product is air-dried, the protein should first be concentrated (e. g., by filtration) to a concentration of at least 35% and preferably at least about 40% solids to prevent liquefication during the drying process. Alternatively, the wet protein cake may be treated with an organic solvent such as a lower alcohol and the solvent-treated protein dried in air.

While warm air (above 45° C.) may be used for the drying of the protein, the protein itself must never become heated above 45° C.; during the drying, the temperature of the protein itself is lower than the temperature of the drying air because of cooling by evaporation of the water contained in the protein cake, and only toward the very end of the drying will it be necessary to reduce the temperature of the drying air.

In the preparation of the final product for utilization, general practice is to grind the protein to a desired mesh size. Obviously, when spray drying or a similar method has been used, a grinding process is not necessary but in the tray drying process shown in the examples, a grinding step is required. The grinding equipment, of course, must be so designed that a minimum of heat is evolved during the grinding step in order to prevent denaturation of the protein; accordingly, a differential roll mill with water-cooled rolls will be highly satisfactory.

During the entire isolation of the soybean protein, great care was taken to avoid contamination with metallic substances. It is obvious, of course, that one source of contamination might be the equipment used for the processing and, accordingly, throughout the entire process ordinary iron and steel equipment was avoided. It was found advisable in the various steps to use lined equipment such as porcelain or glass-lined tanks and the like, or alternatively, to use stainless steel equipment wherever possible.

It is understood that variations and modifications may be made in the isolation of an undenatured protein according to this invention. For example, while sulfur dioxide is preferred as a precipitating agent, because of the fact that its use apparently results in a lighter colored product, there may be substituted for the sulfur dioxide combinations of sulfite releasers with other acids provided they do not form insoluble or highly colored complexes with the protein. Likewise, perchloric or persulfuric acid or other oxidizing acids such as a combination of a peroxide and an acid will give a satisfactory protein product. Similarly, where the use of an alkali such as sodium hydroxide has been specified in the examples, it will be understood that there may be substituted other alkalizing agents such as potassium hydroxide, and certain organic compounds such as quaternary amines, again with the provision that the substituted agents must not form insoluble or highly colored complexes with the protein.

The undenatured protein according to this invention can be used in fiber formation, as a paper coating ingredient, as a general adhesive, in the manufacture of cold water paints, as a general protective colloid, as a film-forming agent, a plastic, or in any of the other fields in which proteinlike materials are commonly used.

The advantages of the invention are apparent from the foregoing description. The new product is substantially undenatured and has almost universal utility as a vegetable protein. Where special properties are desired, this undenatured protein may be further treated; for example, if it is desirable to have a partially denatured protein the product according to this invention may be denatured to a controlled extent, thus permitting the use of the protein, after further treatment, where a denatured protein is required.

What we claim and desire to protect by Letters Patent is:

A process for isolating substantially undenatured protein from soybean meal which has had oil removed therefrom at temperatures under 45° C., comprising treating the soybean meal with about 15 parts of soft water having a total salt concentration of less than ½% and having less than 4 parts per million iron, less than 70 parts per million chromium, and less than 70 parts per million magnesium, at a temperature between 20° C. and 35° C. in the presence of a bactericide characterized by being compatible with protein material and at a pH between 6.4 and 7.0, separating the resulting liquid from the resulting fibrous materials, passing the liquid in a turbulent flowing stream and continuously injecting a dilute aqueous solution of sulfurous acid into said turbulent flowing stream to acidify the liquid to a pH between 3.5 and 5.0 at a temperature between 30° C. and 35° C., thereby precipitating the protein therefrom, and separating and drying the protein at a temperature under 45° C.

JAMES J. EBERL.
RICHARD T. TRELFA.

REFERENCES CITED

The following references are of record in the file of this patent:

UNITED STATES PATENTS

| Number | Country | Date |
| --- | --- | --- |
| 1,321,480 | Satow | Nov. 11, 1919 |
| 1,992,002 | Chapell | Feb. 19, 1935 |
| 2,007,962 | Burruss | July 16, 1935 |
| 2,099,379 | Spellacy | Nov. 16, 1937 |
| 2,233,213 | Kniseley | Feb. 25, 1941 |
| 2,278,670 | Rauer | Apr. 7, 1942 |
| 2,297,685 | Brier | Oct. 6, 1942 |
| 2,377,853 | Boyet | June 12, 1945 |

OTHER REFERENCES

Satow, Researches on Oil and Proteid Extraction from Soybean, Tohoku Imperial University (Japan), vol. II, No. 2 (1921), pp. 116 to 118.

Burnett et al., Ind. and Eng. Chem. (March 1945), 37: 276 to 281.

Beckel et al., Ind. and Eng. Chem. (July 1946), 38: 731 to 734.